(12) United States Patent
Henry

(10) Patent No.: US 11,013,162 B2
(45) Date of Patent: May 25, 2021

(54) SYSTEM FOR REDUCING AN OVERALL TRANSPORT PROFILE OF A MULTI-SECTION TILLAGE IMPLEMENT

(71) Applicant: CNH Industrial Canada, Ltd., Saskatoon (CA)

(72) Inventor: James W. Henry, Saskatchewan (CA)

(73) Assignee: CNH Industrial Canada, Ltd., Saskatoon (CA)

(*) Notice: Subject to any disclaimer, the term of this patent is extended or adjusted under 35 U.S.C. 154(b) by 0 days.

(21) Appl. No.: 16/712,455

(22) Filed: Dec. 12, 2019

(65) Prior Publication Data

US 2020/0113120 A1    Apr. 16, 2020

Related U.S. Application Data

(62) Division of application No. 15/800,264, filed on Nov. 1, 2017, now Pat. No. 10,548,255.

(51) Int. Cl.

| | | |
|---|---|---|
| *A01B 73/02* | (2006.01) | |
| *A01B 73/04* | (2006.01) | |
| *A01B 63/32* | (2006.01) | |
| *A01B 76/00* | (2006.01) | |
| *A01B 63/22* | (2006.01) | |
| *A01B 63/16* | (2006.01) | |
| *A01B 49/02* | (2006.01) | |

(52) U.S. Cl.
CPC ............ *A01B 73/046* (2013.01); *A01B 63/16* (2013.01); *A01B 63/22* (2013.01); *A01B 63/32* (2013.01); *A01B 76/00* (2013.01); *A01B 49/02* (2013.01)

(58) Field of Classification Search
CPC ......... A01B 63/16; A01B 63/22; A01B 73/02; A01B 73/046
See application file for complete search history.

(56) References Cited

U.S. PATENT DOCUMENTS

| | | |
|---|---|---|
| 3,880,241 A | 4/1975 | Vincent |
| 4,043,403 A | 8/1977 | Anderson et al. |
| 4,371,039 A * | 2/1983 | Schaaf ................. A01B 63/32 172/244 |
| 5,024,279 A | 6/1991 | Warner et al. |
| 5,251,704 A | 10/1993 | Bourgault et al. |
| 5,303,779 A | 4/1994 | Friggstad |
| 5,449,042 A | 9/1995 | Landphair et al. |
| 5,488,996 A | 2/1996 | Barry et al. |

(Continued)

*Primary Examiner* — Gary S Hartmann
(74) *Attorney, Agent, or Firm* — Rebecca L. Henkel; Rickard K. DeMille

(57) ABSTRACT

A method for reducing an overall transport profile of a multi-section tillage implement. The tillage implement may include a frame including a center frame section and at least one wing frame section. The tillage implement may include a plurality of ground-engaging tools pivotally mounted to the frame. The method may include pivoting each of the plurality of ground-engaging tools away from the ground surface from a ground-engaging position to a retracted position. The frame may be disposed at an initial height relative to the ground surface before pivoting. After pivoting, the frame may be lowered to a transport height relative to the ground surface. At least one wing frame section may be folded relative to the center frame section from an operating position to a transport position to reduce a width of the tillage implement in the widthwise direction.

11 Claims, 12 Drawing Sheets

(56) References Cited

U.S. PATENT DOCUMENTS

| | | |
|---|---|---|
| 5,839,516 A | 11/1998 | Arnold et al. |
| 6,220,366 B1 | 4/2001 | Noonan et al. |
| 6,401,832 B1 | 6/2002 | Payne et al. |
| 6,408,950 B1 | 6/2002 | Shoup |
| 6,902,010 B2 | 6/2005 | Shoup |
| 7,063,167 B1 | 6/2006 | Staszak et al. |
| 7,581,597 B2 | 9/2009 | Neudorf et al. |
| 7,900,711 B2 | 3/2011 | Kinzenbaw |
| 7,921,932 B2 | 4/2011 | Poole |
| 8,141,653 B2 | 3/2012 | Ryder et al. |
| 8,215,413 B2 | 7/2012 | Friggstad |
| 8,342,256 B2 | 1/2013 | Adams et al. |
| 8,408,326 B2 | 4/2013 | Yuen et al. |
| 8,528,657 B1 | 9/2013 | Rosenboom |
| 8,636,078 B2 | 1/2014 | Yuen |
| 8,700,269 B2 | 4/2014 | Hubalek |
| 8,893,816 B2 * | 11/2014 | Maro .................... A01B 63/22 172/311 |
| 9,198,342 B2 | 12/2015 | Friggstad |
| 9,253,937 B2 * | 2/2016 | Horsch ................ A01B 73/048 |
| 9,351,437 B2 * | 5/2016 | Friesen .................. A01B 73/02 |
| 9,516,796 B2 * | 12/2016 | Sudbrink ............. A01B 63/008 |
| 9,999,172 B2 * | 6/2018 | Sudbrink ............... A01B 63/16 |
| 10,076,072 B2 * | 9/2018 | Steinlage ............... A01B 33/02 |
| 10,149,423 B2 * | 12/2018 | Steinlage ............... A01B 63/14 |
| 10,412,876 B2 * | 9/2019 | Sudbrink ............. A01B 73/046 |
| 10,512,205 B2 * | 12/2019 | Sudbrink ............. A01B 73/044 |
| 10,548,255 B2 * | 2/2020 | Henry .................... A01B 76/00 |
| 2014/0060035 A1 | 3/2014 | Barfels et al. |
| 2016/0212927 A1 | 7/2016 | Sudbrink et al. |
| 2019/0098824 A1 | 4/2019 | Kovach |
| 2019/0124821 A1 | 5/2019 | Henry |

* cited by examiner though the focus of the invention will be described in connection with certain exemplary embodiments, it will be understood that the claims are not limited to those embodiments. On the contrary, the claims are intended to cover all alternatives, modifications, and equivalents as may be included within the spirit and scope of the invention as defined by the claims.

SYSTEM FOR REDUCING AN OVERALL TRANSPORT PROFILE OF A MULTI-SECTION TILLAGE IMPLEMENT

CROSS-REFERENCE TO RELATED APPLICATIONS

The present application is a divisional of U.S. patent application Ser. No. 15/800,264, filed Nov. 1, 2017, the disclosure of which is hereby incorporated herein by reference in its entirety for all purposes.

FIELD OF THE INVENTION

The present disclosure generally relates to agricultural implements and, more particularly, to a method for reducing a transport height and/or a transport width of a multi-section tillage implement.

BACKGROUND OF THE INVENTION

Farmers utilize a wide variety of tillage implements to prepare soil for planting. Some such implements may include two or more sections coupled together to perform multiple functions as they are pulled through fields by a tractor. For example, field cultivators may be capable of simultaneously tilling soil and leveling the tilled soil in preparation for planting. Field cultivators may include frames that carry a number of ground-engaging tools, such as cultivator shanks for tilling the soil. The field cultivator may convert compacted soil into a level seedbed with a consistent depth for preparing the soil for planting of a crop. Grass or residual crop material disposed on top of the soil may also be worked into the seedbed so that it does not interfere with a seeding implement subsequently passing through the seedbed. Some field cultivators may also include an optional rear auxiliary implement for finishing the seedbed for seeding. For example, a rear auxiliary implement may include a spike tooth harrow, spring tooth harrow, rolling basket, etc., or any combination thereof.

Tillage implements are often folded to a transport position and driven on public roads from one agricultural work site to another agricultural work site. Tillage implements have been constructed to cover larger and larger swaths of land in a single pass, resulting in wider tillage implements. As a result, such tillage implements have also become larger once folded for transport. Tillage implements having large overall transport profiles may be difficult to transport, e.g., on public roads. For example, for very large tillage implements, a separate "escort vehicle" may be required when traveling on public roads. Additionally, large implements may be difficult to fit through doors or openings to indoor or covered storage areas.

Accordingly, a method and related system of reducing a transport height and/or a transport width of a multi-section tillage implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing an overall transport profile of a multi-section tillage implement. The tillage implement may include a frame, and the frame may include a center frame section and at least one wing frame section. The tillage implement may include a plurality of ground-engaging tools pivotally mounted to the frame. The method may include pivoting each of the plurality of ground-engaging tools away from the ground surface from a ground-engaging position to a retracted position. The frame may be disposed at an initial height relative to the ground surface prior to pivoting each of the plurality of ground-engaging tools away from the ground surface. The method may include, after pivoting each of the plurality of ground-engaging tools away from the ground surface from the ground-engaging position to the retracted position, lowering the frame relative to the ground surface such that the frame is disposed at a transport height relative to the ground surface. The transport height may be less than the initial height. The method may include folding the at least one wing frame section relative to the center frame section from an operating position to a transport position to reduce a width of the tillage implement in the widthwise direction.

In another aspect, the present subject matter is directed to a system for reducing an overall transport profile of a multi-section tillage implement. The system may include a tillage implement including a frame, and the frame may include a center frame section and at least one wing frame section. The system may also include a plurality of ground-engaging tools pivotally mounted to the frame of the tillage implement. The system may include a hydraulic system configured to pivot each of the plurality of ground-engaging tools with respect to the frame. The hydraulic system may be configured to retract a plurality of wheels relative to the frame to raise and lower the frame relative to the ground surface. The system may also include a controller communicatively coupled with the hydraulic system. The controller may include a processor and associated memory. The memory may store instructions that, when executed by the processor, configure the controller to perform operations. The operations may include pivoting, using the hydraulic system, each of the plurality of ground-engaging tools relative to each respective pivoting mount and away from the ground surface from a ground-engaging position to a retracted position. The center frame section may be disposed at an initial height relative to the ground surface prior to pivoting each of the plurality of ground-engaging tools away from the ground surface. The operations may include, after pivoting each of the plurality of ground-engaging tools from the ground surface, retracting, using the hydraulic system, the plurality of wheels relative to the frame to lower the frame relative to the ground surface such that the frame is disposed at a transport height relative to the ground surface. The transport height may be less than the initial height. The operations may include folding the at least one wing frame section from an operating position to a transport position to reduce a width of the tillage implement in the widthwise direction.

In a further aspect, the present subject matter is directed a method of reducing an overall transport profile of a multi-section tillage implement. The tillage implement may include a frame, and the frame may include a center frame section and at least one wing frame section. The tillage implement may include a plurality of ground-engaging tools pivotally mounted to the frame. The method may include pivoting each of the plurality of ground-engaging tools away from the ground surface from a ground-engaging position to a retracted position to provide a transport ground clearance between the plurality of ground-engaging tools and the ground surface sufficient for transporting the implements in the retracted position without raising the frame of the implement relative to the ground surface. The method may include folding the at least one wing frame section relative to the center frame section from an operating position to a transport position to reduce a width of the tillage implement in the widthwise direction. The method may include transporting the implement with the at least one wing frame section folded relative to the center frame section in the transport position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
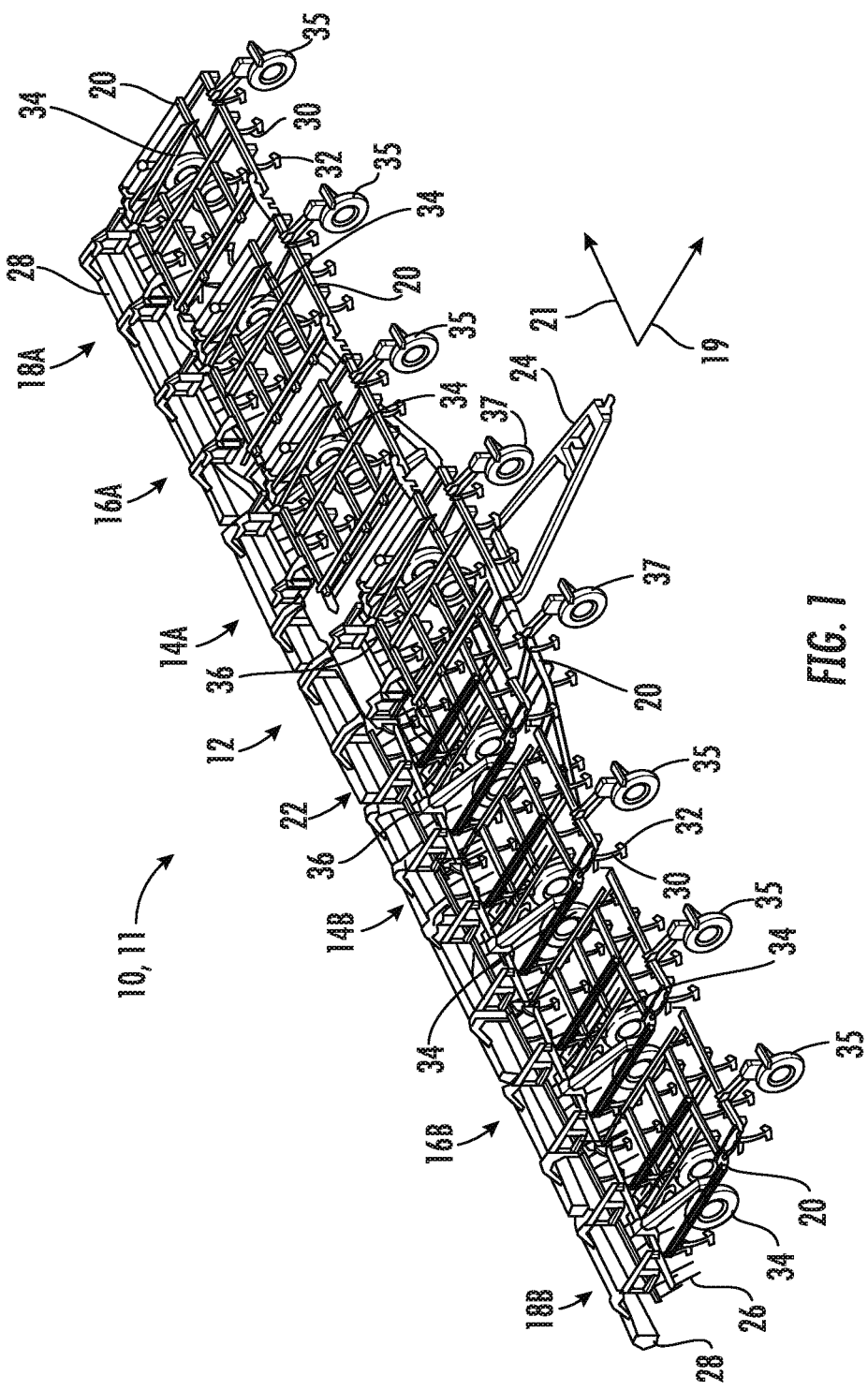
FIG. 1 illustrates a perspective view of one embodiment of an agricultural implement in an operating position in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for reducing an overall transport profile of a multi-section tillage implement and associated systems. The overall transport profile may be associated with a height and a width of the implement in a transport position. Specifically, the method may include pivoting each of a plurality of ground-engaging tools away from a ground surface from a ground-engaging position to a retracted position. The frame may be disposed at an initial height relative to the ground surface before pivoting each of the plurality of ground-engaging tools away from the ground surface. The method may also include lowering the frame relative to the ground surface such that the frame is disposed at a transport height relative to the ground surface. The transport height may be less than the initial height. The method may include folding at least one wing frame section relative to a center frame section of the frame from an operating position to the transport position to reduce the width of the tillage implement in the widthwise direction.

Pivoting the ground-engaging tools to a retracted position in accordance with aspects of the present disclosure may provide several benefits. For example, the implement may be lowered to a lower transport height above the ground surface while still maintaining a suitable ground clearance. This may result in the implement having a smaller height once folded into the transport position. Similarly, pivoting the ground-engaging tools may reduce the extent to which the ground-engaging tools protrude in a widthwise direction once the implement is in the transport position, and thus, reduce the width of the implement in the transport position. Moreover, this may eliminate the need to disconnect a portion of a hydraulic system associated with the wheels to selectively retract only a portion of the wheels, for example to retract lift wheels connected with one of the wing frame sections after the implement has been folded into the transport position. Rather, in some embodiments, all of the lift wheels may be retracted prior to folding the implement into the transport position because the ground-engaging tools, once retracted, may no longer prevent retracting all of the lift wheels. Thus, aspects of the present disclosure may provide a more efficient method to reduce the width of the implement in the transport position.

Figure 2:
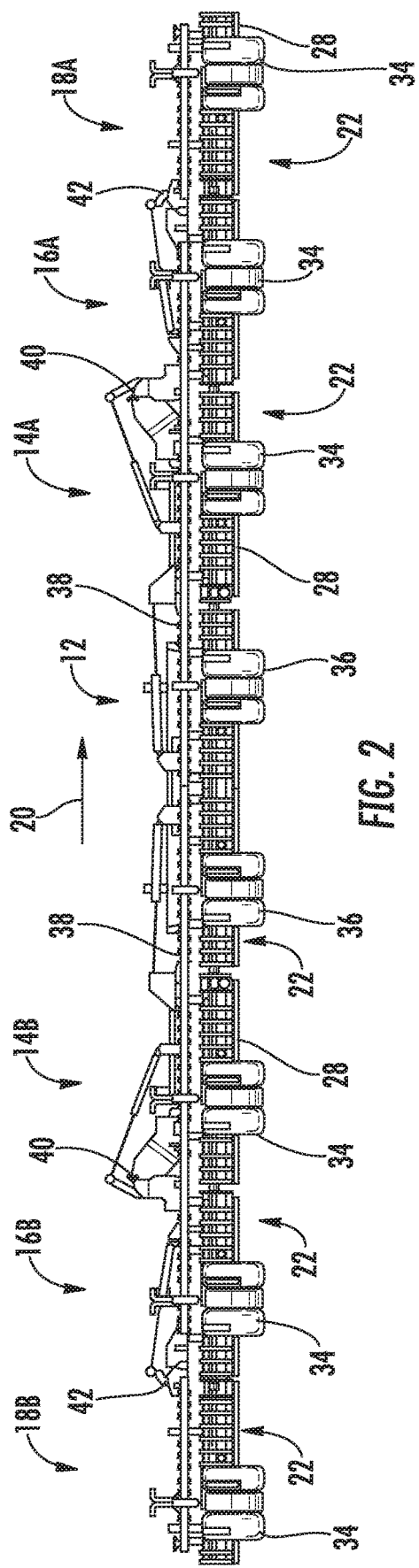
FIG. 2 illustrates a front view of one embodiment of an agricultural implement in an operating position in accordance with aspects of the present subject matter.

Referring to FIGS. 1 and 2, a tillage implement 10 may be configured as a field cultivator 10, for example a multi-section field cultivator 10. The multi-section field cultivator 10 may include a frame 11 having a center frame section 12 and a plurality of wing frame sections 14, 16 and 18. The frame 11 may include beams, bars, and/or the like. In some embodiments, frame 11 may be foldable from an operating position, for example as illustrated in FIGS. 1 and 2, to a transport position, as explained in greater detail below. In some embodiments, the field cultivator 10 may have a triple-fold configuration with three left wings sections 14A, 16A, 18A, and three right wing frame sections 14B, 16B, 18B. The wing frame sections may include inner wing frame sections 14A, 14B, middle wing frame sections 16A, 16B, and outer wing frame sections 18A, 18B. In other embodiments, however, the field cultivator 10 may only have two wing frame sections on each side of the center frame section 12. In yet other embodiments, the field cultivator 10 may have a single wing frame section on each side of the center frame section 12. In yet further embodiments, the field cultivator 10 may have greater than three wing frame sections on each side of the center frame section 12.

Referring still to FIGS. 1 and 2, in some embodiments, the center frame section 12 may be towed by a work vehicle, such as an agricultural tractor (not shown), in a direction of travel 19. The implement 10 may generally extend in a widthwise direction 21 perpendicular to the direction of travel. In some embodiments, a pull hitch 20 may extend forward from the center frame section 12 and be coupled with the work vehicle.

The frame 11 may be configured to support, or otherwise connect with, a plurality of components. For example, in some embodiments, the implement 10 may include one or more rear auxiliary implements 22, for example a spring tooth drag 26 and/or rolling basket 28. The rear auxiliary implements 22 may be configured to finish the soil. In other embodiments, the rear auxiliary implement(s) 22 can include a spike tooth drag, cultivator shanks, etc. In some embodiments, the implement 10 may not include the rear auxiliary implement 22 whatsoever. The cultivator 10 may include a plurality of ground-engaging tools 30 pivotally mounted to the frame 11. For example, cultivator shanks 30 may be pivotally mounted to the center frame section 12 and at least one of the wing frame sections 14, 16, 18. The cultivator shanks 30 may include tip ends 32 at their lower ends for tilling the soil. The tip ends 32 may be configured as shovels, for example.

The implement 10 may include a plurality of lift wheels, configured to support the implement 10 with respect to a ground surface. For example, the implement 10 may include wing lift wheels 34, 35 connected with the wing frame sections 14, 16, 18 and center lift wheels 36, 37 connected with the center frame section 12. The wing lift wheels 34, 35 may include rear wing lift wheels 34 and front wing lift wheels 35. The center lift wheels 36, 37 may also include rear center lift wheels 36 and front center lift wheels 37.

In some embodiments, the implement 10 may include a hydraulic system including a plurality of actuators, such as wheel actuators, implement actuators, and/or folding actuators. For example, the wheel actuators may be configured to raise and lower the plurality of lift wheels relative to the frame 11 such that the frame 11 is raised and lowered relative to the ground surface. The implement actuators may be configured to pivot the plurality of ground-engaging tools away from the ground surface from a ground-engaging position to a retracted position, as explained in greater detail below. The folding actuators may be configured to fold the wing frame sections 14, 16, 18 of the frame 11 relative to the center frame section 12, as explained in greater detail below. In some embodiments, the wheel actuators may be connected in series. In some embodiments, the implement actuators may similarly be connected in series.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 3A:
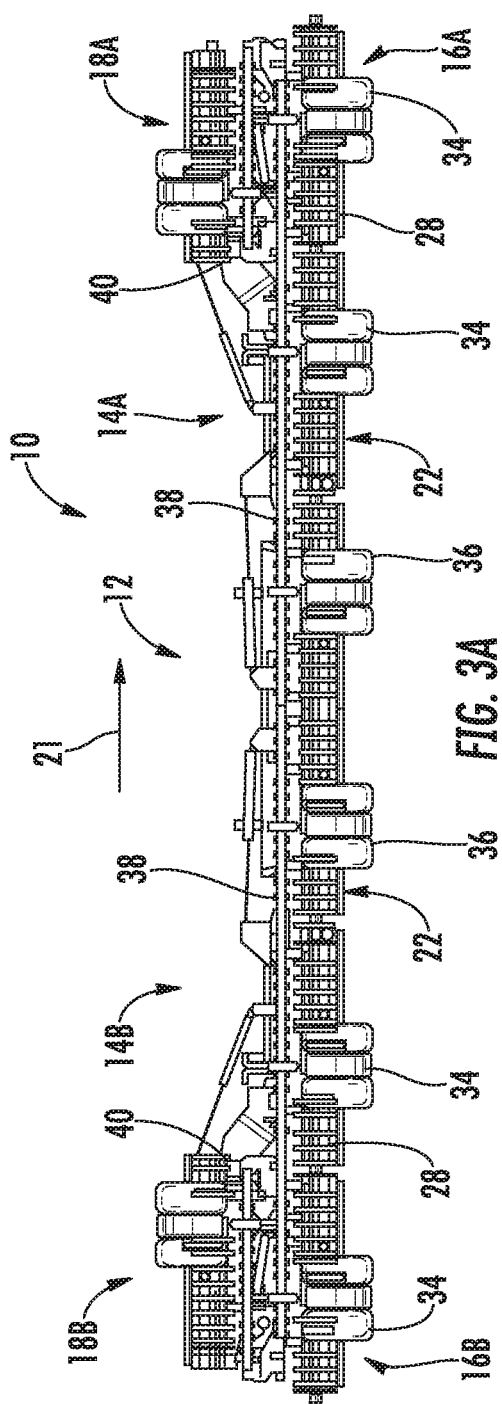
FIGS. 3A and 3B illustrate front views of one embodiment of an agricultural implement during a folding operation in accordance with aspects of the present subject matter.
Figure 3B:
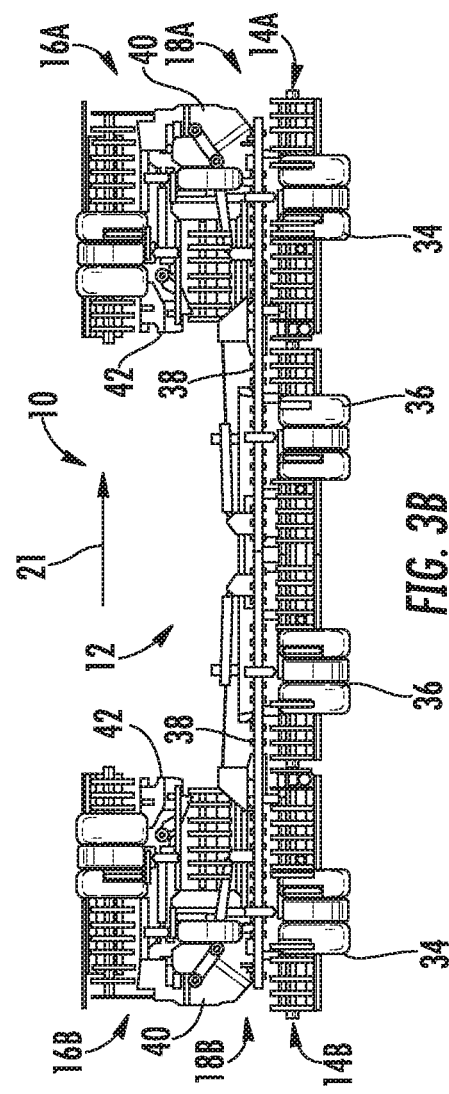
Figure 4:
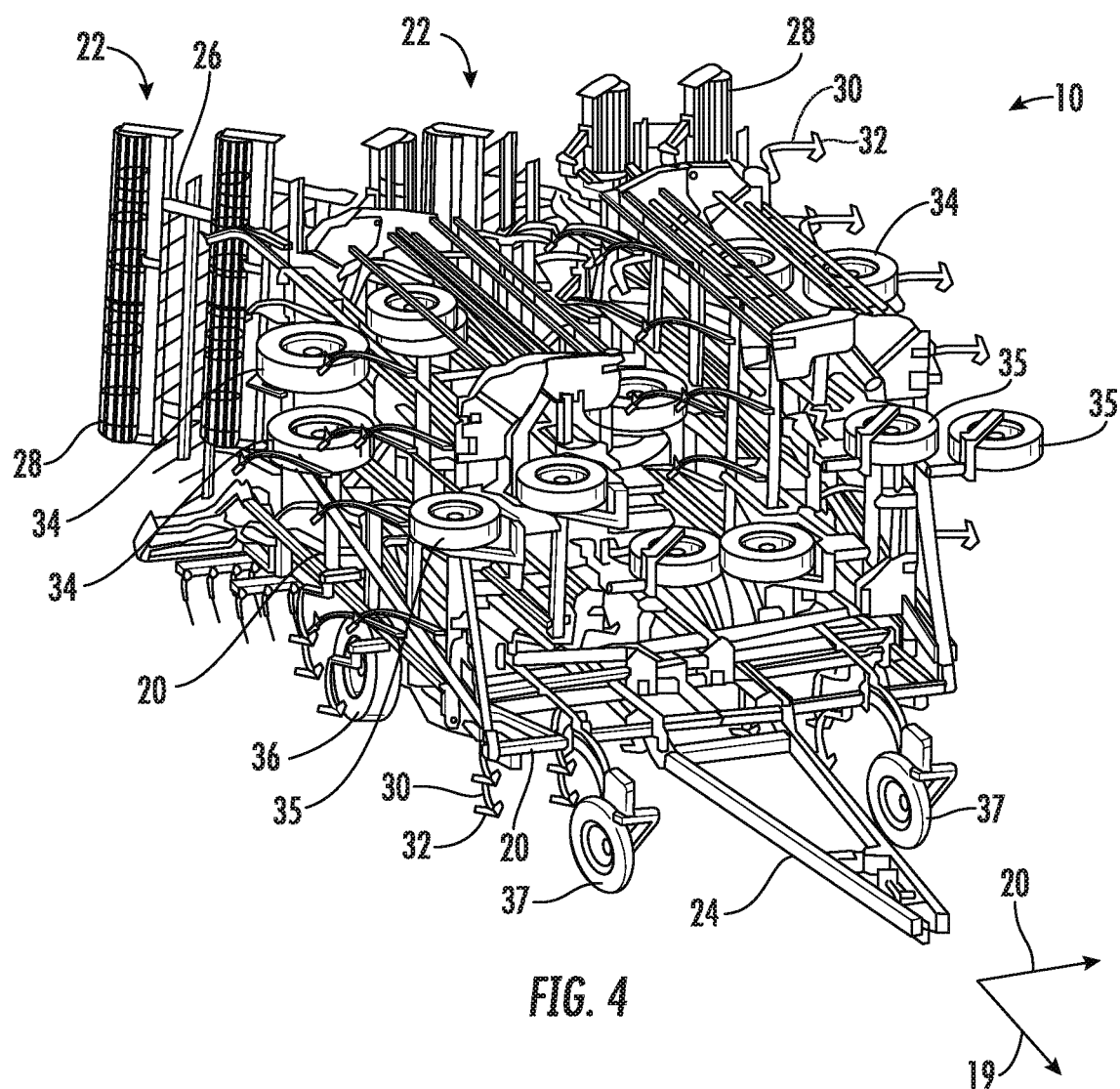
FIG. 4 illustrates a perspective view of one embodiment of an agricultural implement in a transport position in accordance with aspects of the present subject matter.

As indicated above, the implement 10 may be foldable from an operating (unfolded) position, for example as illustrated in FIGS. 1 and 2, to a transport (folded) position. Referring to FIG. 3A, first, each outer wing section 18A and 18B may be folded approximately 180° laterally inward and over a respective middle wing section 16A and 16B. Referring to FIG. 3B, with the outer wing frame sections 18A and 18B in the folded state, each middle wing section 16A and 16B may be folded approximately 180° laterally inward and over a respective inner wing section 14A and 14B. Referring to FIG. 4, with the middle wing frame sections 16A and 16B in the folded state, each inner wing section 14A and 14B may be folded approximately 90° laterally inward and over the center frame section 12. The outer wing frame sections 18, middle wing frame sections 16, and inner wing frame sections 14 may stack together in a horizontally arranged stack over the center frame section 12 when in the folded state. When in the folded state, the outer wing frame sections 18 may be positioned between a respective middle wing section 16 and inner wing section 14. To unfold the field cultivator 10 and transform back to the field or operating position, for example as illustrated in FIGS. 1 and 2, the folding sequence described above may be reversed.

Figure 5A:
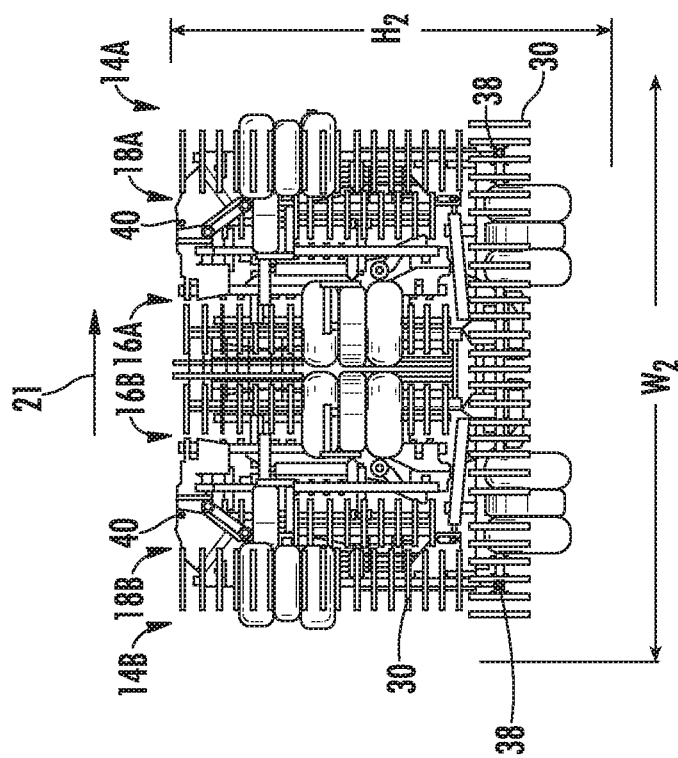
FIGS. 5A and 5B illustrate, respectively, a front view of one embodiment of an agricultural implement in a transport position and a front view of one embodiment of an agricultural implement in a transport position in accordance with aspects of the present subject matter.
Figure 5B:
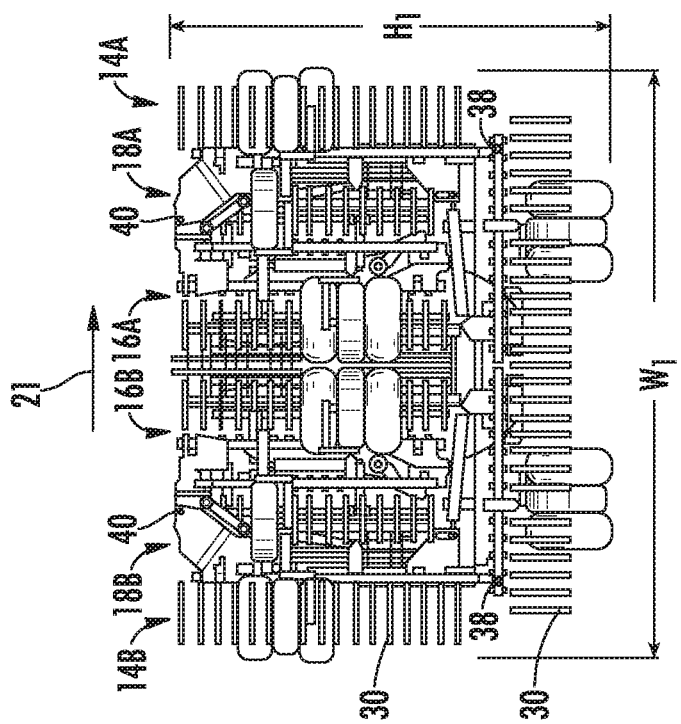

Referring to FIGS. 5A and 5B, aspects of the present disclosure may provide for a more compact implement 10 in the transport position. For example, FIG. 5A illustrates an implement 10 folded into the transport position without retracting the ground-engaging tools 30 or lift wheels 34, 35, 36, 37. The implement 10 may define a first height, $H_1$, and a first width, $W_1$, in such a configuration. In contrast, FIG. 5B illustrates an implement 10 having both the ground-engaging tools 30 and lift wheels 34, 35, 36, 37 retracted in accordance with aspects of the present disclosure. As a result, the height and width of the implement 10 may be reduced. For example, the implement 10 may define a second height, $H_2$, and a second width, $W_2$, with both the ground-engaging tools 30 and lift wheels 34, 35, 36, 37 retracted in accordance with aspects of the present. The second height, $H_2$, and/or second width, $W_2$, may be less than the first height, $H_1$, and/or the first width, $W_1$, respectively. As a result, the implement 10 may be more easily transported on public roads, for example. Additionally, the implement 10 may fit through smaller doors or openings to an indoor or covered storage locations.

Figure 6A:
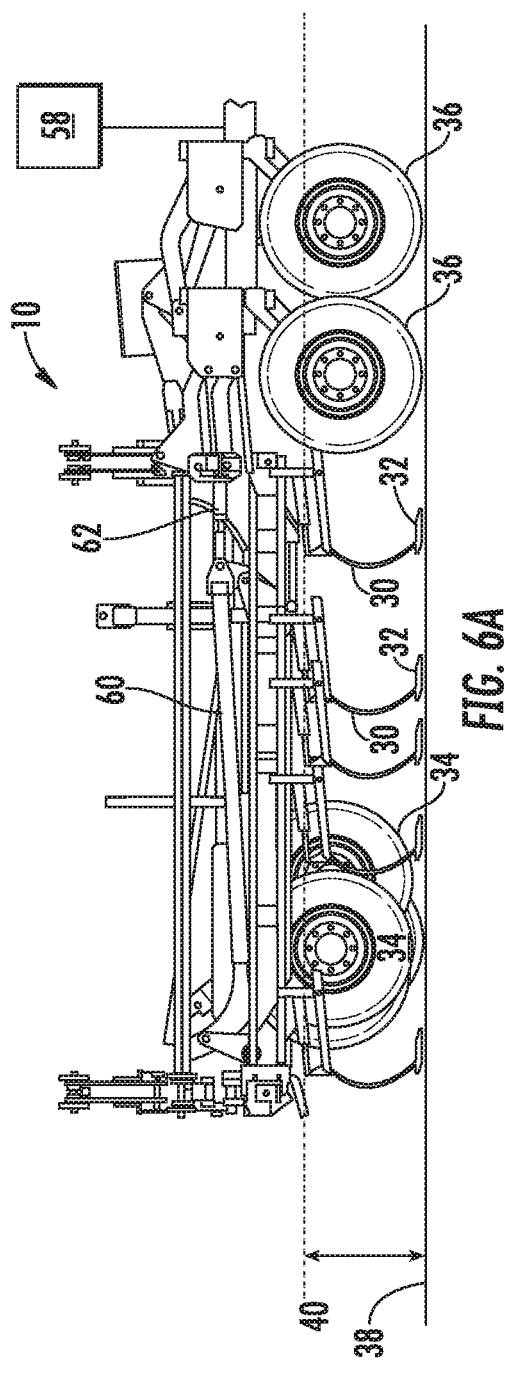
FIGS. 6A and 6B illustrate, respectively, a front view of one embodiment of an agricultural implement in a ground-engaging position and a front view of one embodiment of an agricultural implement in a raised position in accordance with aspects of the present subject matter.

FIG. 6A illustrates an embodiment of the implement 10 in a ground-engaging position. In the ground-engaging position, the tip ends 32 of the ground-engaging tools 30 may be at or below the ground surface 38 for perform a tilling operation relative to the ground surface 38 over which the implement 10 is drawn. In such a ground-engaging position, the frame 11 of the implement 10 may be at an operating height (illustrated by arrow 40) with respect to the ground surface 38.

Figure 6B:
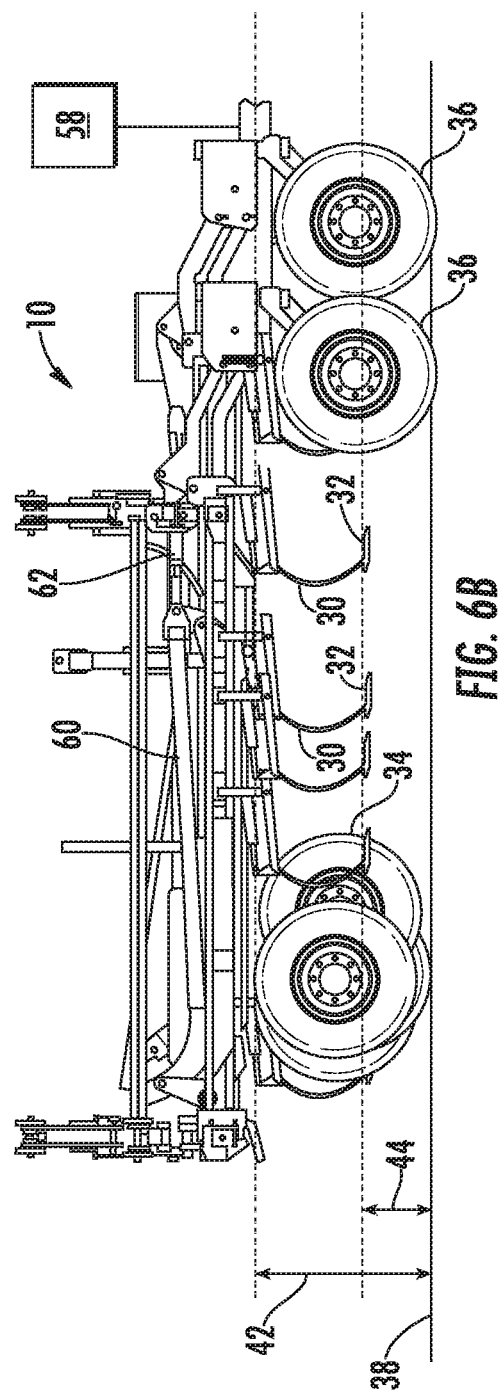

Referring to FIG. 6B, in some embodiments, the various lift wheels 34, 35, 36, 37 may be configured to lift the frame 11 into a raised position in which the frame 11 has a raised height 42 above the ground surface 38. With the frame 11 at the raised height 42, the ground-engaging tools 30 may disposed at a raised ground clearance 44 with respect to the ground surface 38. The raised ground clearance 44 may be sufficient to transport the implement 10 such that the ground-engaging tools 30 do not contact the ground surface 38, despite normal irregularities in the ground surface 38, for example.

Figure 7A:
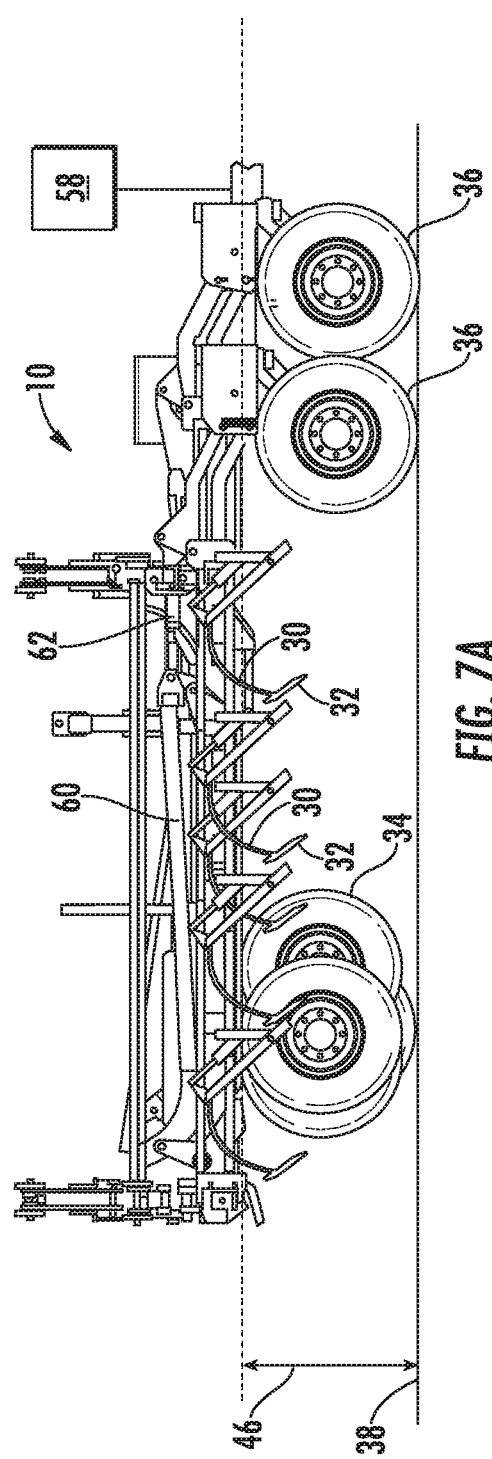
FIG. 7A illustrates a side view of one embodiment of an agricultural implement at a raised height and having a plurality of ground-engaging tools in a raised position in accordance with aspects of the present subject matter.

Referring to FIG. 7A, in some embodiments, the plurality of ground-engaging tools 30 may be pivoted away from the ground surface 38 from the ground engaging position to a retracted position while the frame 11 of the implement 10 is at an initial height 46. In some embodiments, the initial height 46 may be equal to the operating height 40. In other embodiments, the initial height 46 may be equal to the raised height 42. This may provide a greater ground clearance between the ground-engaging tools 30 and the ground surface 38.

Figure 7B:
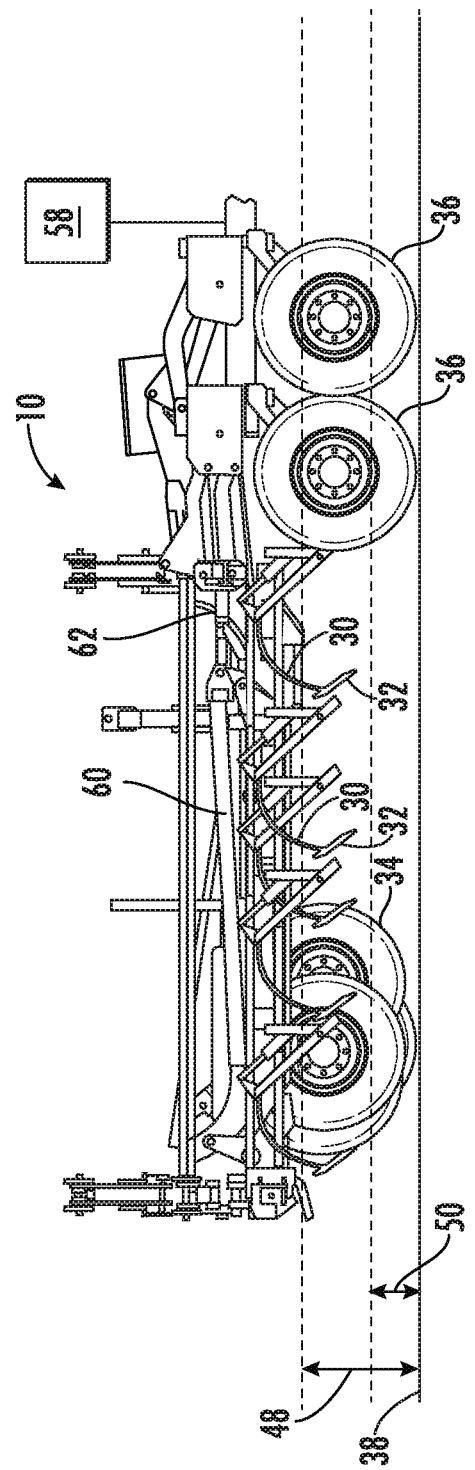
FIG. 7B illustrates a side view of one embodiment of an agricultural implement at a transport height and having a plurality of ground-engaging tools in a raised position in accordance with aspects of the present subject matter.

Referring to FIG. 7B, in some embodiments, the various lift wheels 34, 35, 36, 37 may be configured to lower the frame 11 relative to the ground surface 38 such that the frame 11 is disposed at a transport height 48 relative to the ground surface 38. In some embodiments, the transport height 48 may be less than the initial height 46 described above with reference to FIG. 7A. Moreover, in some embodiments, each of the ground-engaging tools 30 may protrude from the frame 11 and towards the ground surface 38. Thus, retracting the ground-engaging tools 30 relative to the frame 11 may allow the frame 11 to be lowered closer to the ground surface 38 than otherwise possible.

Additionally, this may provide the ability to retract each of the lift wheels 34, 35, 36, 37 relative to the frame 11 prior to folding the frame 11, which may provide several benefits. For example, this capability may provide a more compact implement 10 once the implement 10 is folded into the transport position, for example as discussed with respect to FIGS. 4, 5A, and 5B. Additionally, in some embodiments, the wing lift wheels 34, 35 may be retracted with respect to the frame 11 without disconnecting, or "breaking," a portion of the hydraulic system from the remainder of the hydraulic system. As indicated above, the wheel actuators may be connected in series. Thus retracting the wing lift wheels 34, 35 without retracting the center lift wheels 36, 37 (for example to reduce the width of the implement once folded into the transport position) may require disconnecting a portion of the hydraulic system. Disconnecting a portion of the hydraulic system may involve extra time and labor. Thus, aspects of the present disclosure may provide a more efficient folding procedure resulting in a more compact folded implement 10.

Referring to FIG. 7B, in some embodiments, the ground-engaging tools 30 may be disposed at a transport ground clearance 50 relative to the ground surface 38. In some embodiments, the transport ground clearance 50 may be suitable for transporting the implement 10. For example, the transport ground clearance 50 may be sufficient such that the ground-engaging tools 30 do not contact the ground surface 38 despite normal irregularities in the ground surface 38. In some embodiments, the transport ground clearance 50 may be approximately equal to the raised ground clearance 44, for example, as described with reference to FIG. 6B.

Figure 8A:
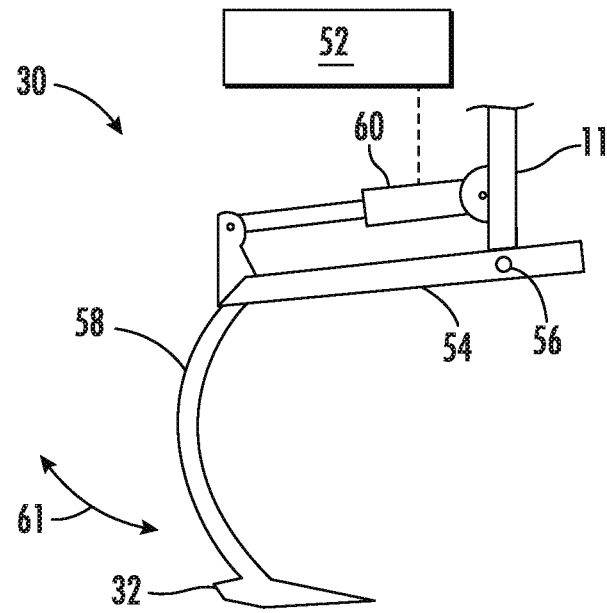
FIGS. 8A and 8B illustrate side views of one embodiment of a ground-engaging tool in, respectively, a ground-engaging position and a retracted position in accordance with aspects of the present subject matter.
Figure 8B:
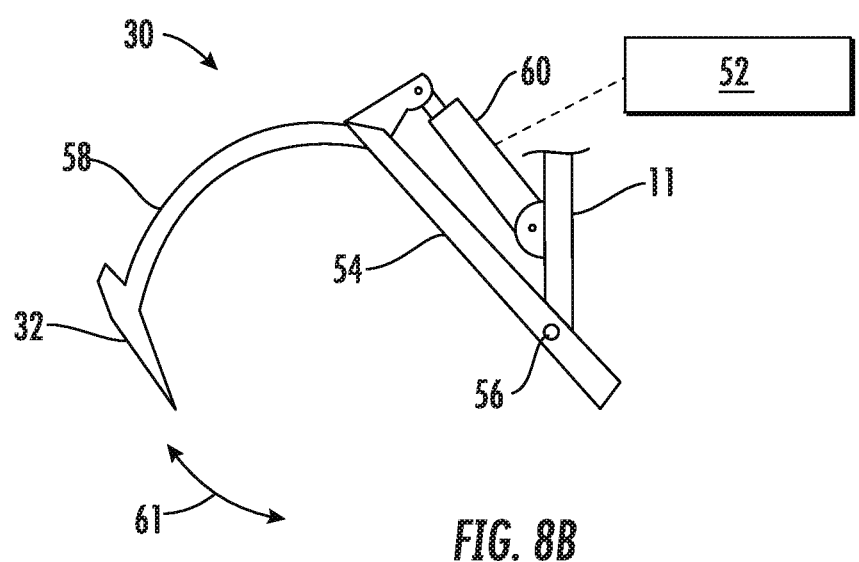

Referring to FIGS. 8A and 8B, as indicated above, in some embodiments the ground-engaging tools 30 may be retractable with respect to the implement frame 11. For example, in some embodiments, the implement 10 may include, or otherwise by associated with a hydraulic system 52 configured to extend and retract the ground-engaging tools. The ground-engaging tools 30 may be pivotally coupled to the implement frame 11 such that the ground-engaging tools 30 may be pivoted from a ground-engaging position, for example as illustrated in FIG. 8B, to a retracted position, for example as illustrated in FIG. 8A. More specifically, in some embodiments, each ground-engaging tool 30 may generally include a base portion 54 pivotally mounted to the frame 11, for example, at a pivoting mount 56. The ground-engaging tool 30 may also include a curved portion 58 extending from the base portion 54 along a curved or arcuate profile.

As indicated above, the hydraulic system 52 may include a plurality of implement actuators 60 configured to pivot the plurality of ground-engaging tools 30 relative to the frame 11. For example, each implement actuator 60 may be connected between the implement frame 11 and a respective base portion 54 of the ground-engaging tool 30. The implement actuator 60 may be configured to pivot the ground-engaging tool 30 about the pivoting mount 56 (as illustrated by arrow 61 in FIGS. 8A and 8B).

In some embodiments, the implement actuators 60 may be single acting such that they are configured to pivot the ground-engaging tools 30 in a single direction. In such embodiments, the ground-engaging tools 30 may include biasing elements, such as springs, configured to counteract the single-acting implement actuators 60. For example, in one embodiment, single-acting implement actuators 60 may be configured to extend the ground-engaging tools 30, and the biasing elements may be configured to return the ground-engaging tools 30 to the retracted position. In other embodiments, single-acting actuators 60 may be configured to retract the ground-engaging tools 30, and the biasing elements may be configured to extend the ground engaging tools 30 to the extended position.

Figure 9A:
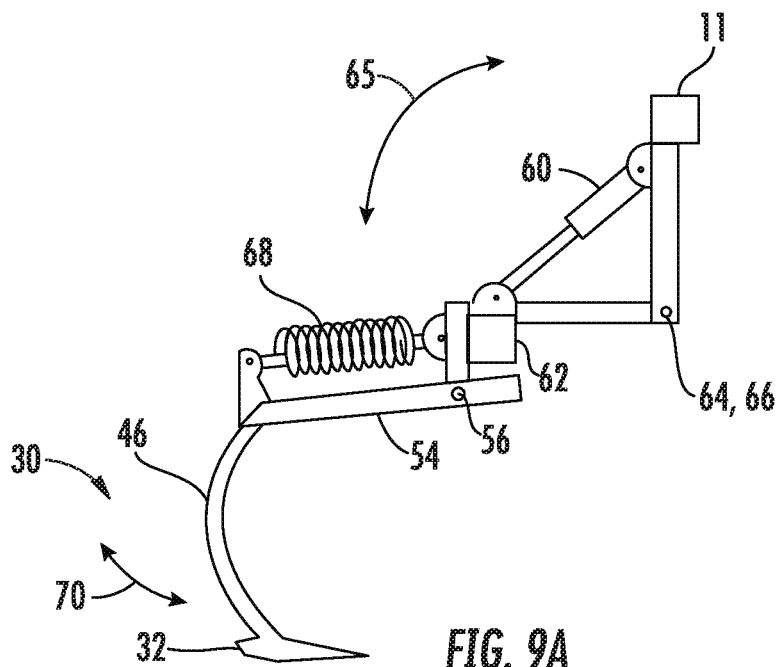
FIGS. 9A and 9B illustrate, respectively, a side view and a perspective view of one embodiment of a plurality of ground-engaging tools mounted to a toolbar in accordance with aspects of the present subject matter.
Figure 9B:
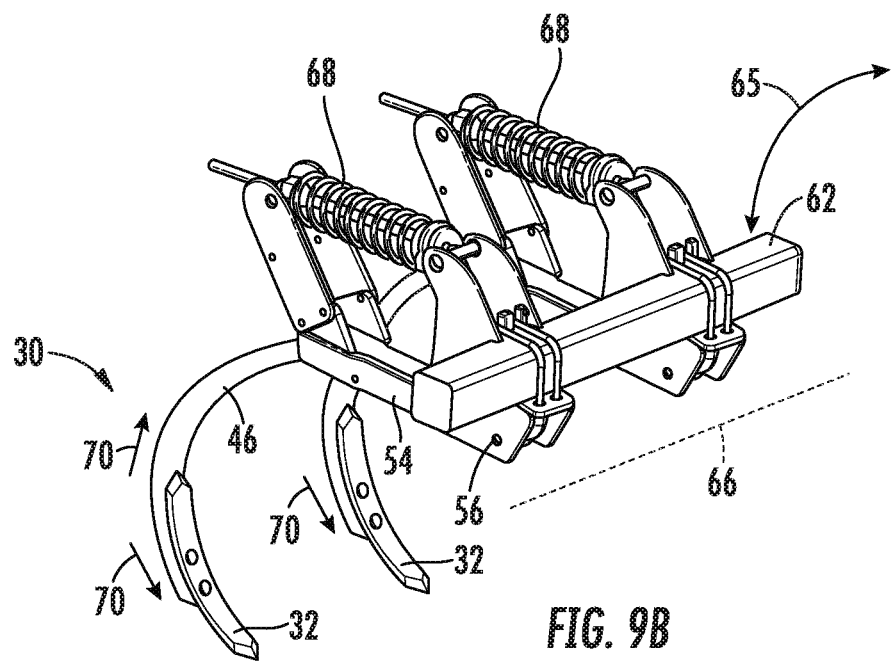

Referring to FIGS. 9A and 9B, in some embodiments, multiple ground-engaging tools 30 may be mounted to a toolbar 62 and the hydraulic system may be configured to pivot the toolbar 62 to pivot the ground-engaging tools 30 from the ground-engaging position to the retracted position. For example, referring to FIG. 9A, the implement actuator 60 may be coupled between the toolbar 62 and frame 11 such that the toolbar 62 may be pivoted relative to the frame 11 (as illustrated by arrows 65) about the toolbar pivoting mount 64. Although the implement actuator 60 and frame 11 are not shown FIG. 9B, it should be understood that in this embodiment, the toolbar 62 may be pivoted about an axis 66 of the toolbar pivoting mount 64. In some embodiments, each ground-engaging tool 30 may be configured with a biasing element 68, such as a spring, for example, instead of having individual implement actuators 60 associated with each ground-engaging tool 30. The biasing element 68 may be configured to exert a biasing force between the ground-engaging tool 30 and the ground surface 38. The biasing element 68 may also allow the ground-engaging tool 30 to move relative to the toolbar 62 and frame 11 to accommodate uneven ground surfaces 38, for example (as illustrated by arrows 70). Any suitable configuration may be used such that multiple ground-engaging tools 30 may be pivoted from the ground-engaging position to the retracted position using one or more implement actuators 60. Additionally, multiple toolbars 62 may form one or more toolbar frames such that sets of ground-engaging tools that are spaced apart in the widthwise direction 21 and/or the direction of travel 19 may be pivoted by raising the toolbar frame(s). For example, a center subset of the plurality of ground-engaging tools 30 may be connected with a center toolbar, and/or a wing subset of the plurality of ground-engaging tools 30 may be connected with a wing toolbar. In some embodiments, the biasing element 68 in the above configuration may instead include, or be replaced by, an actuator.

Thus, in some embodiments, each ground-engaging tool 30 may have an associated implement actuator 60 configured to pivot the ground-engaging tool 30 from the ground-engaging position to the retracted position, for example, as explained with reference to FIGS. 8A and 8B. In other embodiments, one or more implement actuators 60 may be configured to pivot multiple ground-engaging tools 30 using an associated toolbar 62, for example as explained with reference to FIGS. 9A and 9B. In other embodiments, a combination of the above-described configurations may be employed. For example, some implement actuators 60 may be configured to pivot a single ground-engaging tool 30 while other implement actuators 60 may be configured to pivot a toolbar 62 and thereby pivot multiple ground-engaging tools 30.

In some embodiments, the implement actuators 60 may include at least one wing implement actuator 60 associated with at least one of the wing frame sections 14, 16, 18 and configured to pivot one or more ground-engaging tools 30 that are associated with one of the wing frame sections 14, 16, 18. For example, the plurality of ground-engaging tools 30 may include a wing subset of ground-engaging tools. Each ground-engaging tool 30 of the wing subset may be pivotally connected with one of the wing frame sections 14, 16, 18 or with a wing toolbar 62 that is connected with one of the wing frame sections 14, 16, 18.

In some embodiments, the implement actuators 60 may include at least one center implement actuator 60. The plurality of ground-engaging tools 30 may include a center subset of ground-engaging tools 30, and each of the center subset of ground-engaging tools 30 may be pivotally connected with the center frame section 12 of the frame 11 of the implement 10 or a center toolbar 62 that is connected with center frame section 12. Thus, in some embodiments, the center implement actuator 60 may be configured to pivot the center subset of ground-engaging tools 30 with respect to the pivot mounts 56, 64 of each of the center subset of ground-engaging tools 30.

Figure 10:
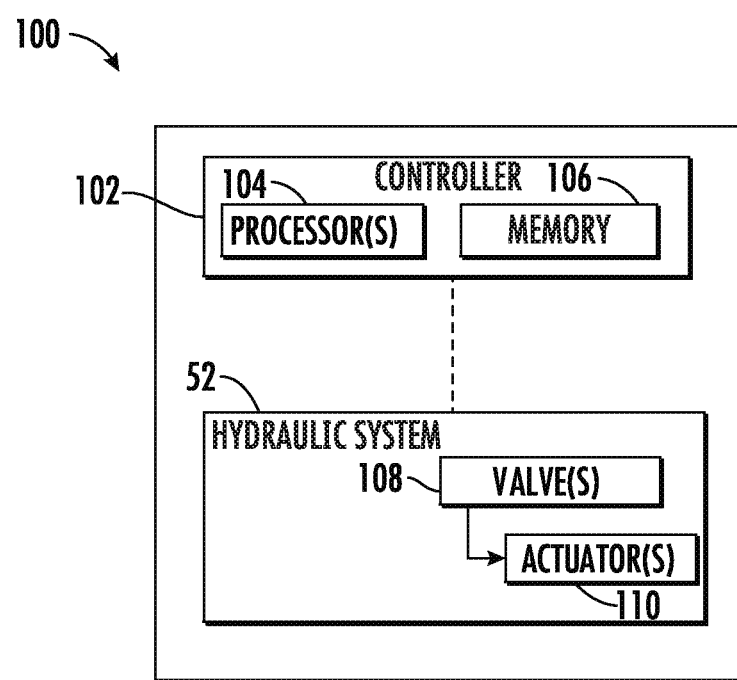
FIG. 10 illustrates a schematic view of one embodiment of a system for reducing an overall transport profile of a multi-section tillage implement in accordance with aspects of the present subject matter.

Referring to FIG. 10, a schematic view of one embodiment of a system 100 for reducing the transport height and/or width of an agricultural implement is illustrated in accordance with aspects of the present subject matter. As shown, the system 100 may include a controller 102 configured to electronically control the operation of one or more components of the implement 10. In general, the controller 102 may correspond to any suitable processor-based device known in the art, such as a computing device or any suitable combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as one or more aspects of the methods 200 and 300 described below with reference to FIGS. 11 and 12. In addition, the controller 102 may also include various other suitable components, such as a communications circuit or module, one or more input/output channels, a data/control bus and/or the like.

It should be appreciated that the controller 102 may correspond to an existing controller 102 of the implement 10 or the work vehicle, or the controller 102 may correspond to a separate processing device. For instance, in one embodiment, the controller 102 may form all or part of a separate plug-in module that may be installed within a control device connected with the implement 10 or the work vehicle to allow for the disclosed system and method to be implemented without requiring additional software to be uploaded onto an existing control device of the implement 10 or the work vehicle.

In some embodiments, the system 100 may include a hydraulic system 52 having one or more control valves 108 configured to regulate the supply of fluid (e.g., hydraulic fluid or air) to one or more of actuators 110 associated with the implement 10. In some embodiments, the actuators 110 may include the implement actuators 60 configured to pivot the ground-engaging tools 30 as described herein. In some embodiments, the actuators 110 may include wheel actuators configured to raise and lower the various lift wheels 34, 35, 36, 37 relative to the frame 11, and/or folding actuators configured to fold the wing frame sections 14, 16, 18 of the frame 11 relative to the center frame section 12.

Figure 11:
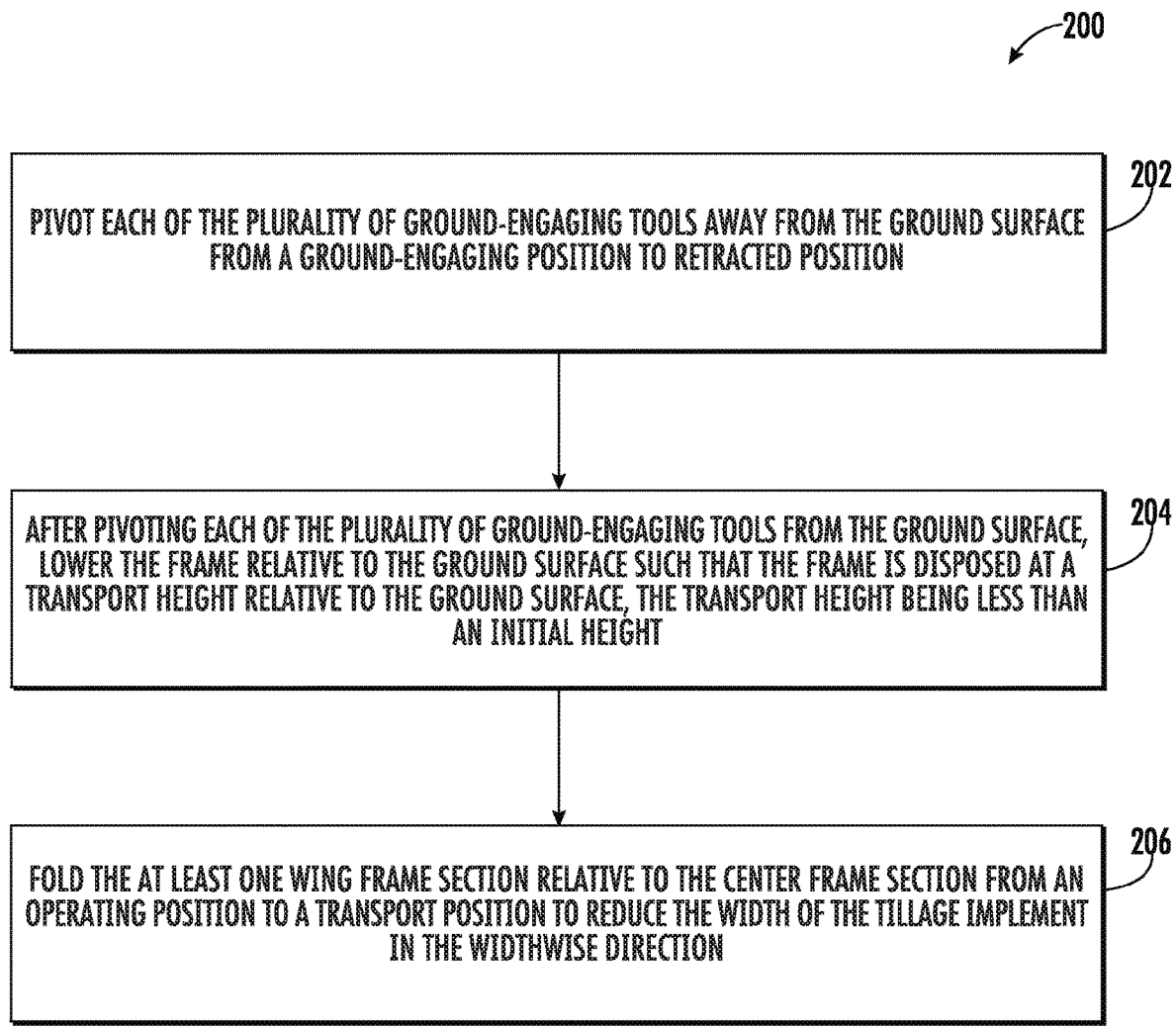
FIGS. 11 and 12 illustrate flow diagrams of respective methods for reducing an overall transport profile of a multi-section tillage implement in accordance with aspects of the present subject matter.

Referring now to FIG. 11, a flow diagram of one embodiment of a method 200 for reducing the height and/or width of a multi-section tillage implement is illustrated in accordance with aspects of the present subject matter. In general, the method 200 will be described herein with reference to the implement 10 and the ground-engaging tools 30 described above with reference to FIGS. 1-9 and the system 100 described above with reference to FIG. 10. However, it should be appreciated by those of ordinary skill in the art that the disclosed method 200 may generally be utilized to reduce the height and/or width or any suitable multi-section tillage implement having any suitable configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 11, the method 200 may include, at (202), pivoting each of the plurality of ground-engaging tools 30 away from the ground surface 30 from the ground-engaging position to the retracted position. For example, in some embodiments, the controller 102 may regulate the supply of fluid (e.g., hydraulic fluid or air) to at least one implement actuator 60 to pivot at least one ground-engaging tool 30 associated with the implement actuator 60. As indicated above, in some embodiments, individual implement actuators 60 may be configured to pivot respective ground-engaging tools 30 about respective pivoting mounts 56. In other embodiments, each implement actuator 60 may be configured to pivot a set of ground-engaging tools 30, for example a wing subset and/or a center subset of the plurality of ground engaging tools about a toolbar pivoting mount 64. In some embodiments, the frame 11 may be disposed at an initial height 46 relative to the ground surface 38 prior to pivoting each of the plurality of ground-engaging tools 30 away from the ground surface 38. For example, in some embodiments, the initial height 46 of the frame 11 may equal the raised height 42 as explained with reference to FIG. 6A. In some embodiments, the method 200 may also include raising the frame 11 (for example to the raised height 42) from the operating height 40 before pivoting the plurality of ground-engaging tools 30. This may remove the tips ends 32 of the plurality of ground-engaging tools 30 from the ground surface 38 such that the plurality of ground-engaging tools 30 can be safely and/or more easily pivoted into the retracted position.

In an alternative embodiment, the frame 11 may not be raised from the operating height 40 to the raised height 42 before pivoting each of the plurality of ground-engaging tools 30. In other words, in some embodiments, the initial height 46 of the frame 11 may be approximately equal to the operating height 40, for example as explained with reference to FIG. 6A. In such embodiments, the ground-engaging tools 30 may be pivoted while the frame 11 is at the operating height 40 with respect to the ground surface 38, for example, as explained with reference to FIG. 6A. In such embodiments, pivoting each of the plurality of ground-engaging tools 30 may include retracting the tip ends 32 of the ground-engaging tools 30 from the ground surface 38.

In some embodiments, pivoting each of the plurality of ground-engaging tools 30 may include actuating at least one wing implement actuator 60 configured to actuate a wing subset of the plurality of ground-engaging tools 30. Each of the wing subset of the plurality of ground-engaging tools 30 may be connected with one of the wing frame section(s) 14, 16, 18. In some embodiments, pivoting each of the plurality of ground-engaging tools 30 may include pivoting a wing toolbar 62 relative to the frame 11, for example as explained with reference to FIGS. 9A and 9B. The wing toolbar 62 may be coupled with each of the wing subset of the plurality of ground-engaging tools 30.

In some embodiments, pivoting each of the plurality of ground-engaging tools 30 may include actuating at least one center implement actuator 60 configured to pivot a center subset of the plurality of ground-engaging tools 30 relative to the frame 11. Each of the center subset of the plurality of ground-engaging tools 30 may be connected with the center frame section 12. In some embodiments, pivoting each of the plurality of ground-engaging tools 30 may include pivoting a center toolbar 62 relative to the frame 11, for example as explained with reference to FIGS. 9A and 9B. The center toolbar 62 may be coupled with each of the center subset of the plurality of ground-engaging tools 30.

The method 200 may include, at (204), after pivoting each of the plurality of ground-engaging tools 30 from the ground surface 38, lowering the frame 11 relative to the ground surface 38 such that the frame 11 is disposed at a transport height 48 relative to the ground surface 38, and the transport height 48 may be less than the initial height 46. As indicated above, in some embodiments, the initial height 46 may equal the raised height 42. The initial height 46 may be greater than the operating height 40 of the frame 11, for example as explained with reference to FIGS. 6A and 6B. In other embodiments, however, the initial height 46 may be less than the raised height 42. For example, in some embodiments, the frame 11 may be lowered from the operating height 40 to the transport height 48. In other embodiments, the frame 11 may be lowered from an initial height that is greater than the operating height 40 but less than the raised height 42.

The controller 102 may be configured to lower the frame 11 relative to the ground surface 38 using the hydraulic system 52. The hydraulic system 52 may be configured to regulate the supply of fluid (e.g., hydraulic fluid or air) to one or more of actuators 110 associated with one or more of the lift wheels 34, 35, 36, 37 to raise the lift wheels 34, 35, 36, 37 relative to the frame 11, and thus lower the frame 11 relative to the ground surface 38. In some embodiments, lowering the frame 11 relative to the ground surface 38, at (204), may include retracting the plurality of lift wheels 34, 35, 36, 37 relative to the frame 11 without disconnecting a portion of a hydraulic system 52 configured to retract at least a portion of the plurality of wheels 34, 35, 36, 37, as discussed above.

In some embodiments, lowering the frame 11 relative to the ground surface 38 may include retracting a plurality of wheels 34, 35, 36, 37 relative to the frame 11 to lower both the wing frame sections 14, 16, 18 and the center frame section 12 relative to the ground surface 38. In such embodiments, both the wing frame sections 14, 16, 18 and the center frame section 12 may be disposed at the transport height 48 relative to the ground surface 38. For example, in some embodiments, each of the plurality of wheels 34, 35, 36, 37 associated with the frame 11 may be retracted to lower the frame 11 across a width of the frame 11 relative to the ground surface 38. In some embodiments, this may be performed before folding the at least one wing frame section 14, 16, 18 from the operating position to the transport position.

At (206), the method 200 may include folding at least one wing frame section 14, 16, 18 relative to the center frame section 12 from the operating position to the transport position to reduce the width of the tillage implement 10 in the widthwise direction 21. For example, the implement 10 may be folded as described above with reference to FIGS. 1-5. As indicated above, however, the implement 10 may have any suitable configuration such that at least one wing frame section 14, 16, 18 may be folded relative to the center frame section 12 to reduce the width of the implement 10.

Figure 12:
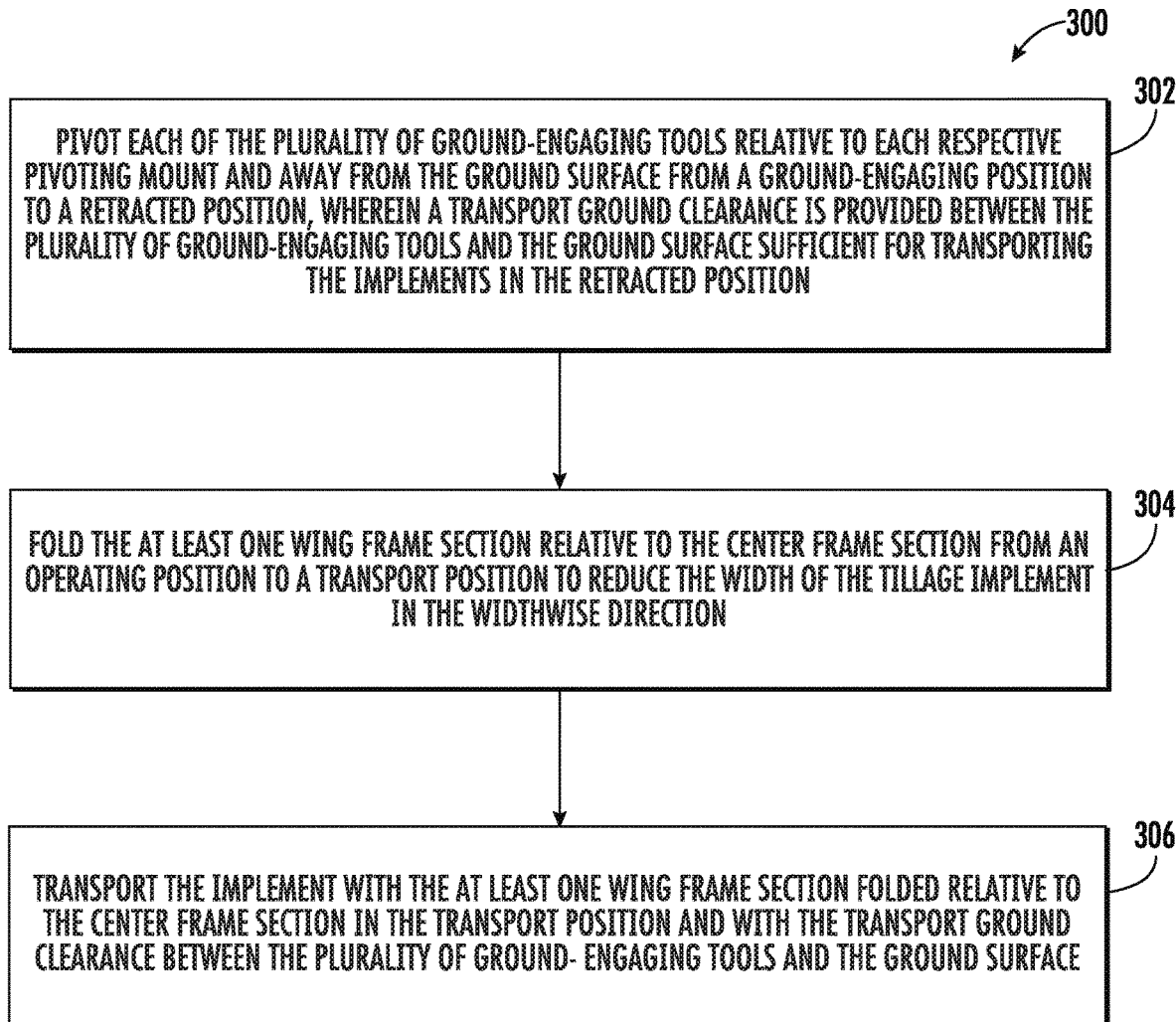

FIG. 12 illustrates a flow diagram of one embodiment of another method 300 for reducing the height and/or width of a multi-section tillage implement in accordance with aspects of the present subject matter. In general, the method 300 will be described herein with reference to the implement 10 and the ground-engaging tools 30 described above with reference to FIGS. 1-9 and the system 100 described above with reference to FIG. 10. However, it should be appreciated by those of ordinary skill in the art that the disclosed method 300 may generally be utilized to reduce the height and/or width or any suitable multi-section tillage implement having any suitable configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method may including pivoting each of the plurality of ground-engaging tools 30 relative to each respective pivoting mount 56, 64 and away from the ground surface 38 from a ground-engaging position to a retracted position. A transport ground clearance 50 may be provided between the plurality of ground-engaging tools 30 and the ground surface 38 that is sufficient for transporting the implement 10 with the ground-engaging tools 30 in the retracted position without raising the frame 11 of the implement 10 relative to the ground surface 38.

In some embodiments, before pivoting each of the plurality of the ground-engaging tools 30, the frame 11 of the implement 10 may be disposed at an initial height 46 relative to the ground surface 38, for example as explained above with reference to FIGS. 6A, 6B, and 11. When at least one of the wing frame sections 14, 16, 18 is folded relative to the center frame section 12, the frame 11 may be disposed at a transport height 48 that is not greater than the initial height 46. In some embodiments, pivoting each of the plurality of ground-engaging tools 30 may include pivoting at least one of the plurality of ground-engaging tools 30 at least 20 degrees with respect to the frame 11 of the implement 10. For example, in some embodiments, at least one of the plurality of ground-engaging tools 30 may be pivoted at least 30 degrees, in some embodiments, at least 45 degrees, and in some embodiments at least 80 degrees with respect to the frame 11. For example, in some embodiments, at least one of the plurality of ground-engaging tools 30 may be pivoted between 20 and 100 degrees, in some embodiments between 30 and 90 degrees, and in some embodiments between 45 and 70 degrees with respect to the frame 11.

At (304), the method 300 may include folding at least one of the wing frame sections 14, 16, 18 relative to the center frame section 12 from an operating position to a transport position to reduce the width of the tillage implement 10 in a widthwise direction 21, for example as explained with reference to FIGS. 1-5.

At (306), the method 300 may include transporting the implement 10 with at least one of the wing frame sections 14, 16, 18 folded relative to the center frame section 12 in the transport position and with the transport ground clearance 50 between the plurality of ground-engaging tools 30 and the ground surface 38. As indicated above, the transport ground clearance 50 may be sufficient for transporting the implements 10 in the retracted position. The ground surface 38 may have irregularities (e.g., bumps, holes etc.), such that the frame 11 of the implement 10 may move up and down as the implement 10 is transported over the ground surface 38. The transport ground clearance 50 may be large enough that the implement 10 may be transported across typical public roads and/or typical agricultural work sites without the ground surface 38 contacting and damaging the ground-engaging tools 30 as a result of such irregularities.

For example, in some embodiments, the transport ground clearance 50 may be between about 2 inch to about 12 inches, and in some embodiments between about 4 inches and 8 inches. Moreover, in some embodiments, the amount of ground clearance required to prevent damage to the ground-engaging tools may depend on the size of the lift wheels 34, 35, 36, 37. Thus, in some embodiments, the transport ground clearance 50 may range from about 10 percent to about 50 percent of an average radii of the plurality of lift wheels 34, 35, 36, 37 coupled with the frame 11 and configured to support the frame 11 on the ground surface 38. In some embodiments, the transport ground clearance 50 may range from about 15 percent to about 40 percent of the average radii of the plurality of lift wheels 34, 35, 36, 37.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for reducing an overall transport profile of a multi-section tillage implement, the system comprising:
   a tillage implement including a frame, the frame including a center frame section and at least one wing frame section;
   a plurality of ground-engaging tools pivotally mounted to the frame of the tillage implement;
   a hydraulic system configured to pivot each of the plurality of ground-engaging tools with respect to the frame, the hydraulic system configured to retract a plurality of wheels relative to the frame to raise and lower the frame relative to the ground surface;
   a controller communicatively coupled with the hydraulic system, the controller including a processor and associated memory, the memory storing instructions that, when executed by the processor, configure the controller to:
      pivot, using the hydraulic system, each of the plurality of ground-engaging tools away from the ground surface from a ground-engaging position to a retracted position, the center frame section being disposed at an initial height relative to the ground surface prior to pivoting each of the plurality of ground-engaging tools away from the ground surface;
      after pivoting each of the plurality of ground-engaging tools from the ground surface; retract, using the hydraulic system; the plurality of wheels relative to the frame to lower the frame relative to the ground surface such that the frame is disposed at a transport height relative to the ground surface, the transport height being less than the initial height; and
      fold the at least one wing frame section from an operating position to a transport position to reduce the width of the tillage implement in the widthwise direction.

2. The system of claim 1, wherein:
   the plurality of ground-engaging tools include respective pivoting mounts, the plurality of ground-engaging tools pivotally connected with the frame at the respective pivoting mounts;
   the hydraulic system further comprises a plurality of implement actuators configured to pivot the plurality of ground-engaging tools relative to respective pivoting mounts; and
   the controller is further configured to actuate the at least one implement actuator to pivot the plurality of ground-engaging tools with respect to the respective pivoting mounts and away from the ground surface from the ground-engaging position to the retracted position.

3. The system of claim 1, wherein:
   the frame of the implement includes a toolbar coupled with each of a subset of the ground-engaging tools, and the toolbar includes a toolbar pivoting mount, the toolbar pivotally mounted to the frame at the toolbar pivoting mount;
   the hydraulic system further comprises at least one implement actuator configured to pivot the toolbar relative to the toolbar pivoting mount; and
   the controller is further configured to actuate the at least one implement actuator to pivot each of the plurality of ground-engaging tools relative to the toolbar pivoting mount and away from the ground surface from the ground-engaging position to the retracted position.

4. The system of claim 1, wherein:
the frame of the implement includes a center toolbar coupled with each of a center subset of the ground-engaging tools, and the center toolbar includes a center toolbar pivoting mount, the center toolbar pivotally mounted to the center frame section at the center toolbar pivoting mount;
the hydraulic system further comprises at least one implement actuator configured to pivot the center toolbar relative to the center toolbar pivoting mount; and
the controller is further configured to actuate the at least one implement actuator to pivot each of the plurality of ground-engaging tools relative to the toolbar pivoting mount and away from the ground surface from the ground-engaging position to the retracted position.

5. The system of claim 1, wherein the controller is further configured to, before folding the at least one wing frame section, retract both a wing wheel subset of the plurality of wheels connected with the at least one wing frame section and a center wheel subset of the plurality of wheels relative to the center frame section to lower both the at least one wing frame section and the center frame section relative to the ground surface such that both the at least one wing frame section and the center frame section are disposed at the transport height relative to the ground surface.

6. The system of claim 1, wherein, when the frame is disposed at the transport height relative to the ground surface, a ground clearance between the plurality of ground-engaging tools and the ground surface is between about 2 inch to about 12 inches.

7. The system of claim 1, wherein, when the frame is disposed at the transport height relative to the ground surface, a ground clearance between the plurality of ground-engaging tools and the ground surface is from about 10 percent to about 50 percent of an average radii of the plurality of wheels.

8. The system of claim 1, wherein the at least one wing frame section comprises an outer wing section coupled to a middle wing section, the middle wing section coupled to the center frame section, and wherein folding the at least one wing frame section relative to the center frame section from the operating position to the transport position comprises folding the outer wing section relative to the middle wing section of the at least one wing frame section.

9. The system of claim 8, wherein folding the outer wing section relative to the middle wing section comprises folding the outer wing section approximately 180 degrees relative to the middle wing section.

10. The system of claim 1, wherein the at least one wing frame section comprises a middle wing section coupled to the center frame section, and wherein folding the at least one wing frame section relative to the center frame section from the operating position to the transport position comprises folding the middle wing section of the at least one wing frame section relative to the center frame section.

11. The system of claim 10, wherein folding the middle wing section of the at least one wing frame section relative to the center frame section comprises folding the middle wing section of the at least one wing frame section approximately 90 degrees relative to the center frame section.

* * * * *